United States Patent Office  3,836,488
Patented Sept. 17, 1974

3,836,488
TRIS[2-(DIMETHYLAMINO)ETHYL]AMINE AS CATALYST FOR THE PREPARATION OF POLYURETHANES
Ronnie M. Pruitt and James L. Potter, Lake Jackson, Tex., assignors to The Dow Chemical Company, Midland, Mich.
No Drawing. Continuation of abandoned application Ser. No. 78,641, Oct. 6, 1970. This application Aug. 16, 1973, Ser. No. 389,099
Int. Cl. C08g 22/44
U.S. Cl. 260—2.5 AC    10 Claims

ABSTRACT OF THE DISCLOSURE

Urethanes produced from isocyanate reactions with active hydrogen containing compounds are catalyzed with tris[-(dimethylamino)ethyl]amine.

CROSS-REFERENCE TO RELATED APPLICATION

This is a continuation of application Ser. No. 78,641, filed Oct. 6, 1970, and now abandoned.

This invention relates to a catalyst for the reaction of organic isocyanate with active hydrogen-containing compounds. It further relates to the use of tris[2-(dimethylamino)ethyl]amine as a catalyst for the reaction of organic isocyanates with active hydrogen-containing compounds.

It is known to prepare polyurethanes from isocyanate-containing compounds and active hydrogen-containing compounds employing amine compounds, particularly tertiary amine compounds such as triethylene diamine, tetramethyl-butanediamine, dimethylethanolamine, n-ethyl morpholine and cyclic tertiary amines such as triethylene diamine as catalysts therefor. The cyclic tertiary amine, triethylenediamine, has long been recognized as a unique catalyst for urethane formation because its reactivity is greater than that of the non-cyclic tertiary amines. Also, another class of tertiary amines, the bis[beta-(N,N-dimethylamino)alkyl]ethers have been shown to have a high order of reactivity as catalysts for urethane formation.

It has now been discovered that tris[2-(dimethylamino)ethyl]amine, which may be represented by the general formula

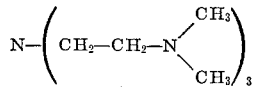

a non-ether, non-cyclic tertiary amine has a high order of reactivity as a catalyst for urethane formation.

The tris[2-(dimethylamino)ethyl]amine can be prepared by the procedure reported in the Journal of the American Chemical Society, Vol. 76, Part 2, pages 2414–17 (1954).

The process of the invention is preferably employed in the reaction of organic polyisocyanates with compositions having at least 2 active hydrogen atoms, although monofunctional reactants can be employed, for example, in the production of compositions useful as plasticizers and in organic syntheses. Among the organic isocyanates that can be employed in the invention are monoisocyanates such as phenyl isocyanate, tolylisocyanates, benzyl isocyanate, xylyl isocyanates, hexyl isocyanate, and other aromatic and aliphatic isocyanates. Preferred isocyanates for use in the process of the invention are organic polyisocyanates. Illustrative polyisocyanates include, among others, 2,4- and 2,6-tolylene diisocyanate, 3,3-tolidene 4,4'-diisocyanate, isocyanates produced by phosgenation of the condensation products of formaldehyde and various aromatic amines such as bis(3-methyl-4-isocyanatophenyl)methane, bis(4-isocyanatophenyl)methane, any isocyanates disclosed in U.S. Pat. No. 2,683,730, and the like. Additional polyisocyanates that are useful in the invention include 1,5-naphthalene diisocyanate, xylylenediisocyanates, 1,3-phenylene diisocyanate, tris(4-isocyanatophenyl)methane, chlorophenylene diisocyanates, hexamethylene diisocyanate, bis(3-isocyanatopropoxy)ethane, and many others. Other organic monoisocyanates and polyisocyanates that can be employed in the process of the invention are disclosed in the literature, for example, in an article by Siefken, Annalen, 562, pages 75–135 (1949) in U.S. Pats. 3,093,451 and 3,084,177 and in the Saunders et al. text, Polyurethanes: Chemistry and Technology, Part 1, Interscience Publishers. The aromatic polyisocyanates are particularly useful in the invention, especially the tolylene diisocyanates and the polyisocyanates produced by phosgenation of the condensation products of aniline and formaldehyde.

In the process of the invention one or more organic isocyanates are reacted with one or more active hydrogen-containing compounds. The active hydrogen compounds contemplated are those which contain reactive hydrogen as determined by the procedure described by Zerewitinoff, J. Am. Chem. Soc., 49, page 3181 (1927). Among the various classes of compounds that contain reactive hydrogen are alcohols, water, amines, ureas, urethanes, phenols, thiols, carboxylic acids, and the like. The preferred active hydrogen-containing reactants are water and primary and secondary alcohols. Since urethanes, amines, and ureas are produced when an isocyanate is reacted with an alcohol and water, urethanes, amines, and ureas are also preferred reactants. The amines are also very useful reactants in many cases, for example, when the process of the invention is employed to produce an amine-cured elastomer.

A large variety of alcohols can be used in the invention. For instance, alkanols such as methanol, ethanol, 2-propanol, butanol, 2-ethylhexanol, any many other alkanols. The preferred alcohols for use in the invention are the polyols, for instance, one or more polyols from the following classes of compositions:

(a) Hydroxyl-terminated polyesters and polyester-ethers;
(b) Polyhydroxyalkanes and alkylene oxide adducts thereof;
(c) Trialkanolamines and alkylene oxide adducts thereof;
(d) Alcohols derived from mono- and polyamines by addition of alkylene oxides;
(e) Non-reducing sugar and sugar derivatives and alkylene oxide adducts thereof;
(f) Alkylene oxide adducts of aromatic amine/phenol/ aldehyde ternary condensation products;
(g) Alkylene oxide adducts of phosphorus and polyphosphorus acids, and various hydroxyl-terminated phosphites and phosphonates;
(h) Alkylene oxide adducts of polyphenols;
(i) Polytetramethylene glycols;
(j) Functional glycerides, such as castor oil;
(k) Hydroxyl-containing polymers; and the like.

Illustrative hydroxyl-terminated polyesters are those which are prepared by polymerizing a lactone (preferably, an epsilon-caprolactone) in the presence of an active hydrogen-containing starter as disclosed in U.S. Pats. 2,914,556; 2,890,208; 2,878,236 and 2,977,385. Polyesters from adipic acid and diols such as ethylene glycol, propylene glycol, diethylene glycol, dipropylene glycol, and the like, and triols such as 1,1,1-trimethylolpropane, 1,2,6-hexanetriol, glycerol, and others, are also useful. Copolymers of lactones and alkylene oxides, such as those described in U.S. Pat. 2,962,524, can also be used with good results.

Illustrative polyhydroxyalkanes include, among others, ethylene glycol, propylene glycol, 1,3-dihydroxypropane 1,3-dihydroxybutane, 1,4-dihydroxybutane, 1,4-, 1,5-, and 1,6-dihydroxyhexane, 1,2-, 1,3-, 1,5-, 1,6-, and 1,8-dihydroxyoctane, 1,10-dihydroxydecane, glycerol, 1,2,5- trihydroxybutane, 1,2,6-trihydroxyhexane, 1,1,1-trimethylolethane, 1,1,1-trimethylolpropane, pentaerythritol, xylitol, arabitol, sorbitol, mannitol, and the like. The alkylene oxide adducts of the above-exemplified polyhydroxyalkanes can also be employed, preferably the ethylene oxide, propylene oxide, the epoxybutane, the epichlorohydrin, or mixtures thereof, adducts of said polyhydroxyalkanes.

Another useful class of polyols which can be employed are the trialkanolamines and the alkylene oxide adducts thereof. Illustrative trialkanolamines include triethanolamine, triisopropanolamine, and tributanolamines. The alkylene oxide adducts which can be employed are preferably those wherein the oxyalkylene moieties thereof have from 2 to 4 carbon atoms.

Another useful class of polyols which can be employed are the alkylene oxide adducts of mono- and polyamines. The mono- and polyamines are preferably reacted with alkylene oxides which have 2 to 4 carbon atoms, for example, ethylene oxide, 1,2-epoxypropane, the epoxybutanes and mixtures thereof. Mono- and polyamines suitable for reaction with alkylene oxides include, among others, methylamine, ethylamine, isopropylamine, butylamine, benzylamine, aniline, the toluidines, naphthylamines, ethylenediamine, diethylenetriamine, triethylenetetramine, 1,3-butanediamine, 1,3-propane diamine, 1,4-butanediamine, 1,2-, 1,3-, 1,4-, 1,5-, and 1,6-hexanediamine, phenylenediamines, toluenediamine, naphthalenediamines, and the like. Among the compounds of the above groups which are of particular interest are, among others, N,N,N',N' - tetrakis(2 - hydroxyethyl)ethylenediamine, N,N,N',N'',N''-pentakis(2 - hydroxypropyl)diethylamine, N,N,N',N'',N''-pentakis(2 - hydroxypropyl)diethylenetriamine, phenyldiisopropanolamine and higher alkylene oxide adducts of aniline, and the like. Others which deserve particular mention are the alkylene oxide adducts of aniline or substituted aniline/formaldehyde condensation products.

A further class of polyols which can be employed are the non-reducing sugars, the non-reducing sugar derivatives, and more preferably, the alkylene oxide adducts thereof wherein the alkylene oxides have from 2 to 4 carbon atoms. Among the non-reducing sugars and sugar derivatives contemplated are sucrose, alkyl glycosides such as methyl glucoside, ethyl glucoside, and the like, polyol glycosides such as ethylene glycol glucoside, propylene glycol glucoside, glycerol glucoside, 1,2,6-hexanetriol glucoside, and the like.

A still further useful class of polyols are the alkylene oxide adducts of polyphenols wherein the alkylene oxides have from 2 to 4 carbon atoms. Among the polyphenols which are contemplated are found, for example, bisphenol A, bisphenol F, condensation products of phenol and formaldehyde, more particularly the novolac resins, condensation products of various phenolic compounds and acrolein. The simplest members of this class being the 1,1,3 - tris(hydroxyphenyl)propanes, condensation products of various phenolic compounds and glyoxal, glutaraldehyde, and other dialdehydes, the simplest members of this class being the 1,1,2,2-tetrakis(hydroxyphenyl)ethanes, and the like.

Another desirable class of polyols are the alkylene oxide (preferably the ethylene oxide, 1,2-epoxypropane, epoxybutane, and mixtures thereof) adducts of aromatic amine/phenol/aldehyde ternary condensation products. The ternary condensation products are prepared by condensing an aromatic amine, for instance aniline, toluidine, or the like, a phenol such as phenol, cresol, or the like, and an aldehyde preferably formaldehyde, at elevated temperatures in the range of, for example, from 60° C. to 180° C. The condensation product is then recovered and reacted with alkylene oxide, using a basic catalyst (e.g., potassium hydroxide) if desired, to produce the polyols. The propylene oxide and mixed propyleneethylene oxide adducts of aniline / phenol / formaldehyde ternary condensation products deserve particular mention.

The alkylene oxide adducts of phosphorus and polyphosphorus acids are another useful class of polyols. Ethylene oxide, 1,2-epoxypropane, the epoxybutanes, 3-chloro-1,2-epoxypropane, and the like are preferred alkylene oxides. Phosphoric acid, phosphorous acid, the polyphosphoric acids such as tripolyphosphoric acid, and the like are desirable for use in this connection. Also useful are phosphites such as tris(dipropylene glycol) phosphite and the phosphonates which can be produced therefrom by heating in the presence of, e.g., butyl bromide, as well as the alkylene oxide adducts thereof.

Another useful class of polyols are the polytetramethylene glycols, which are prepared by polymerizing tetrahydrofuran in the presence of an acidic catalyst.

Also useful are castor oil and alkylene oxide adducts of castor oil.

Another useful class of polyols are various polymers that contain pendant hydrovyl groups. Illustrative are polyvinyl alcohol, vinyl chloride-vinyl alcohol copolymers, and other copolymers of various ethylenically-unsaturated monomers and vinyl alcohol. Also useful are polymers formed by reacting a dihydric phenol, for instance, 2,2-bis(4-hydroxyphenyl)propane, with epichlorohydrin in the presence of sodium hydroxide, such as the polymers disclosed in U.S. Pat. No. 2,602,075.

The polyol or polyol mixture employed can have hydroxyl numbers which vary over a wide range. In general, the hydroxyl numbers of the polyols employed in the invention can range from about 20, and lower to about 1000, and higher, preferably, from about 30 to about 600, and more preferably, from about 35 to about 450. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where:

OH = hydroxyl number of the polyol.
$f$ = average functionality, that is, average number of hydroxyl groups per molecule of polyol.
N.W. = average molecular weight of the polyol.

The exact polyol employed depends upon the end-use of the polyurethane product of the process of the invention. For example, when used to prepare foams, the functionality and the hydroxyl number are selected properly to result in flexible, semi-flexible, or rigid foams. The above polyols preferably possess a hydroxyl number of from about 200 to about 800 when employed in rigid foam formulations, from about 50 to about 250 for semi-flexible foams, and from about 20 to about 70 or more when employed in flexible foam formulations. Such limits are not intended to be restrictive, but are merely illustrative of the large number of possible combinations of the above polyol coreactants.

Another useful class of active hydrogen-containing reactants is the amines. Illustrative amines include hydrazine, ethylene diamine, diethylenetriamine, triethylenetetramine, monoethanolamine, 1,3-propanedianine, 1,4-butanediamine, aniline, diaminobenzenes, diaminotoluenes, condensation product of aniline or other aromatic amine and formaldehyde, bis(3-chloro-4-aminophenyl) methane; and various other amines. The amines are generally employed wherein the process of the invention is used to produce a polyurethane elastomer, in which case the isocyanate employed is a prepolymer produced by reacting excess diisocyanate with a polyol.

The proportions in which the organic isocyanate and active hydrogen compound are employed are such that there is normally provided about one isocyanato group per active hydrogen-containing group (i.e., hydroxyl, amino, and the like), although the ratios can be varied over a wide range. For instance, in the production of polyurethane foams, usually up to about 5 percent excess isocyanate (over that required to react with all alcoholic hydroxyl and water) is normally employed.

The tertiary amine ethers can be employed as sole catalysts for isocyanate/active hydrogen reactions, or they can be employed in combination with other catalysts. In particular, the organic tin catalysts are advantageously employed in combination with the tertiary amine ethers.

One preferred class of organic tin catalysts are the stannuos acylates, for instance, stannous acetate, stannous octoate, stannous laurate, stannous oleate, and the like. Stannous octoate is a highly preferred organic tin catalyst for use in combination with the tertiary amine ethers of the invention.

Another useful class of organic tin catalysts are the organotin compounds. These compounds are characterized by having at least 1 direct carbon to tin valence bond, any remaining bonds to tin being to halogen, oxygen, hydrogen, sulfur, nitrogen, or phosphorus. Among the many organotin compounds that can be employed in the invention are the following:

A. Tin compounds having four carbon to tin bonds such as tetramethyltin, tetraethyltin, tetrapropyltin, tetrabutyltin, tetraoctyltin, tetralauryltin, tetrabenzyltin, tetrakis(2-phenylethyl)tin, tetraphenyltin, tetraparatolyltin, tetravinyltin, tetraallyltin, tetrachloromethyltin, tetramethanesulfonylmethyltin, tetraparamethoxyphenyltin, tetraparanitrophenyltin, as well as unsymmetrical compounds as exemplified by 2-cyanoethyltributyltin, dibutyldiphenyltin and various addition products of alkyl, aryl and aralkyltin hydrides with unsaturated organic compounds such as acrylonitrile, allyl cyanide, crotonitrile, acrylamide, methyl acrylate, allyl alcohol, acrolein diethyl acetal, vinyl acetate, styrene, and the like;

B. Tin compounds having $n$ carbon to tin bonds and $4-n$ bonds from tin to halogen or hydrogen atoms or hydroxy groups in which $n$ is an integer in the range of from 1 to 3, such as trimethyltin chloride, tributyltin chloride, trioctyltin chloride, triphenyltin chloride, trimethyltin bromide, tributyltin fluoride, triallyltin chloride, tributyltin hydride, triphenyltin hydride, trimethyltin hydroxide, tributyltin hydroxide, dimethyltin dichloride, dibutyltin dichloride, dioctyltin dichloride, bis(2-phenylethyl)tin dichloride, diphenyltin dichloride, divinyltin dichloride, diallyltin dibromide, diallyltin diodide, dibutyltin difluoride, bis(carboethoxymethyl)tin diodide, bis (1,3 - diketopentane)tin dichloride, dibutyltin dihydride, butyltin trichloride and octyltin trichloride;

C. Tin compounds having two carbon to tin bonds and a double bond from tin to oxygen or sulfur, such as dimethyltin oxide, diethyltin oxide, dibutyltin oxide, dioxyltin oxide, dilauryltin oxide, diphenyltin oxide and diallyltin oxide, all prepared by hydrolysis of the corresponding dihalides.

D. Tin compounds having $n$ carbon to tin bonds and $4-n$ bonds from tin to oxygen, sulfur, nitrogen or phosphorus linking organic radicals, $n$ being an integer of from 1 to 3, such as tributyltin methoxide, tributyltin butoxide, tributyltin acetate, tributyltin phosphorus dibutoxide, dibutyl bis-(O-acetylacetonyl)tin, dibutyltin bis(octyl maleate), dibutyltin bis(thiododeoxide), di-butyltin bis(octyl thioglycolate), dibutyltin bis(N-morpholinylcarbonylmethylmercaptide), dibutyltin dibenzenesulfonamide, dimethyltin diacetate, diethyltin diacetate, dibutyltin diacetate, dioctyltin diacetate, dilauryltin diacetate, dibutyltin dilaurate, dibutyltin maleate, dibutyltin bis(N-piperazinyl-thiocarbonylmercaptide), dioctyltin bis(N - piperazinyl - thiocarbonylmercaptide), octyltin tris(thiobutoxide) butyltin triacetate, methylstannonic acid, ethylstannonic acid, butylstannonic acid, octylstannonic acid;

E. polystannic compounds having carbon to tin bonds and preferably also bonds from tin to halogen, hydrogen, oxygen, sulfur, nitrogen or phosphorus, such as $$HOOSn(CH_2)_xSnOOH$$

and $HOOSnCH_2(CH_2OCH_2)_xCH_2SnOOH$, the $x$'s being positive integers, bis-trimethyltin, bis-triphenyltin, bistributyltin distannoxane, dibutyltin basic laurate, dibutyltin basic hexoxide and other polymeric organo-tin compounds containing carbon to tin bonds and preferably also bonds, e.g., those having repeating

groups, dimers and trimers of $(R_2SnY)_n$ and the like in which the R's may be alkyl, aryl or aralkyl radicals and the Y's are chalcogens, as well as many other organotin compounds heretofore proposed as heat and light stabilizers for chlorinated polymers and available commercially for this purpose.

The tris[3-(dimethylamino)ethyl]amine catalyst is employed in the process of this invention in catalytically significant quantities. For instance, concentrations in the range of from about .01 weight percent to about 2.0 weight percent, and higher, to about 5 weight percent, have been found useful. Preferred concentrations are found in the range of from about 0.1 weight percent to about 0.5 weight percent (all percentages being based upon weight of the reactants, i.e., organic isocyanate plus active hydrogen-containing compound). When one or more additional catalysts are used, the above-indicated range of proportions are also applicable to such other catalysts.

The process of the invention is advantageously employed to produce polymeric products by the reaction of organic polyisocyanates with polyols, polyamines, water, and the like. Particularly preferred polymeric products are polyurethane foams that are produced by reacting an organic polyisocyanate with a polyol in the presence of a blowing agent which can be water, a liquified gas, or the like. The polyisocyanate and polyol reactants that can be used to produce polyurethane foams are described above. The preferred blowing agents are water and certain halogen-substituted aliphatic hydrocarbons which have boiling points between about —40° C. and 70° C., and which vaporize at or below the temperature of the foaming mass. Illustrative are for example, trichloromonofluoromethane, dichlorodifluoromethane, dichloromonofluoromethane, dichloromethane, trichloromethane, bromotrifluoromethane, chlorodifluoromethane chloromethane, 1,1 - dichloro - 1 - fluoroethane, 1,1 - difluoro - 1,2,2-trichloroethane, chloropentafluoroethane, 1-chloro-1-fluoroethane, 1-chloro-2-fluoroethane, 1,1,2 - trichloro-1,2,2-trifluoroethane, 1,1,1-trichloro - 2,2,2-trifluoroethane, 2-chloro - 1,1,1,2,3,3,4,4,4 - nonafluorobutane, hexafluorocyclobutene, and octafluorocyclobutane. Other useful blowing agents include low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N,N'-dimethyldinitroisoterephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pound per cubic foot respectively.

In producing foamed reaction products, it is also within the scope of the invention to employ small amounts, e.g. about 0.001% to 5.0% by weight on the total reaction mixture, of an emulsifying agent such as a polysiloxane-polyoxyalkylene block copolymer having from about 10 to 80 percent by weight of siloxane polymer and from 90 to 20 percent by weight of alkylene oxide polymer, such as the block copolymers described in U.S. Pats. 2,834,748 and 2,917,480. Another useful class of emulsifiers are the "non-hydrolyzable" polysiloxane-polyoxyalkylene block copolymers. This class of compounds differs from the above-mentioned polysiloxane-polyoxyalkylene block copolymers in that the polysiloxane moiety is bonded to the polyoxyalkylene moiety through direct carbon-to-silicon bonds, rather than through carbon-to-oxygen-to-silicon bonds. These copolymers generally contain from 5 to 95 percent, and preferably from 5 to 50 weight percent, of polysiloxane polymer with the remainder being polyoxyalkylene polymer. The copolymers can be prepared, for example, by heating a mixture of (a) a polysiloxane polymer containing a silicon-bonded, halogen-substituted monovalent hydrocarbon group, and (b) an alkali metal salt of a polyoxyalkylene polymer, to a temperature sufficient to cause the polysiloxane polymer and the salt to react to form the block copolymer. Other useful emulsifiers and surfactants include such materials as dimethyl silicone oil, polyethoxylated vegetable oils, commercially available as "Selectrofoam 6903," "Emulphor FL–720" and others. Although the use of an emulsifier is desirable to influence the type of foam structure that is formed, the foam products of the invention can be prepared without emulsifiers in some cases.

The techniques for producing polyurethane foams by the one shot, prepolymer, or semi-prepolymer methods are well known in the art, as is exemplified by the Saunders et al. text, cited above.

In some cases it is desirable to add a small quantity (e.g. up to 5 parts per 100 parts of polyol) of a dipolar aprotic solvent such as formamide, N,N-dimethylformamide, or dimethylsulfoxide to the foaming formulation. This serves to "open up" the cell structure when there is an undesired tendency to form closed cell foams.

The process of the invention is highly useful for many applications. For example, where monofunctional reactants are employed, the process is useful for producing composition having utility as plasticizers and in organic synthesis. Where polyfunctional reactants are employed, the process of the invention is useful for producing polymeric materials having known utility, for instance, rigid and flexible polyurethane foams, polyurethane elastomers, polyurethane surface coatings, amine-cured polyurethane elastomers, and the like.

The following examples are illustrative of the present invention and are not to be construed as to limiting the scope of the invention in any manner.

EXAMPLE 1

A. To demonstrate the operability of the catalyst of this invention over a wide range of a tin compound as a co-catalyst, foams were prepared from the formulation given in the following table by metering the following streams into the mixing chamber of a Henecke UB–T–63 foam machine: (1) polyol, (2) toluene diisocyanate (TDI), (3) stannous octoate, (4) water, silicone oil and amine catalysts. It was allowed to rise freely. The recipe, foam conditions, and physical properties of the foam are reported in Table I (foams A: 1–4).

B. For comparative purposes and to demonstrate that the catalyst of the present invention compares favorably, if not better, in foaming characteristics with the tertiary amine ether type catalysts, foams were prepared employing bis[beta(N,N-dimethylamino)ethyl]ether as the catalyst using the procedure of A above. The results are reported in Table I (foams B: 1–3).

TABLE I

| Recipe (parts by wt.) | Foam number | | | | | | |
|---|---|---|---|---|---|---|---|
| | A-1 | A-2 | A-3 | A-4 | B-1 | B-2 | B-3 |
| Toluene diisocyanate [1] | 49.5 | 49.5 | 49.5 | 49.5 | 49.5 | 49.5 | 49.5 |
| CP 4100 [2] | 100 | 100 | 100 | 100 | 100 | 100 | 100 |
| Silicone oil | 0.6 | 0.6 | 0.6 | 0.6 | 0.6 | 0.6 | 0.6 |
| Water | 3.8 | 3.8 | 3.8 | 3.8 | 3.8 | 3.8 | 3.8 |
| Bis(dimethylethyl amino) ether | 0 | 0 | 0 | 0 | 0.10 | 0.10 | 0.10 |
| Tris[2-(dimethylamino)ethyl]amine | 0.10 | 0.10 | 0.10 | 0.10 | 0 | 0 | 0 |
| Stannous octoate | 0.20 | 0.175 | 0.15 | 0.125 | 0.175 | 0.20 | 0.15 |
| Foam conditions: | | | | | | | |
| Stirrer, r.p.m. | 4,000 | 4,000 | 4,000 | 4,000 | 4,000 | 4,000 | 4,000 |
| Conveyer speed, ft./min | 8 | 8 | 8 | 8 | 8 | 8 | 8 |
| Conveyer angle, degree | 3 | 3 | 3 | 3 | 3 | 3 | 3 |
| Cream time, seconds | 10 | 10 | 10 | 11 | 9 | 8 | 8 |
| Rise time, seconds | 92 | 88 | 96 | 105 | 87 | 92 | 94 |
| Property: | | | | | | | |
| Density, p.s.i. | 1.61 | 1.62 | 1.65 | 1.73 | 1.64 | 1.61 | ([3]) |
| Tensile strength, p.s.i. | 16.3 | 15.1 | 14.9 | 15.1 | 18.4 | 19.2 | ([3]) |
| Elongation, percent | 233 | 205 | 200 | 187 | 290 | 328 | ([3]) |
| Tear resistance, lbs./in | 2.9 | 2.5 | 2.7 | 2.6 | 3.7 | 3.7 | ([3]) |
| Resiliency, percent (dropping ball) | 43 | 45 | 45 | 48 | 46 | 46 | ([3]) |
| 90% compression set | 8.6 | 6.5 | 7.3 | 4.9 | 5.7 | 6.1 | ([3]) |
| 4" ILD, 25% | 41 | 43 | 42 | 42 | 42 | 39 | ([3]) |

[1] A mixture of the 2,4- and 2,6-isomers (80–20 wt. percent respectively) having an NCO equivalent weight of 78.
[2] CP 4100 is a glycerine initiated polyoxypropylene triol having an OH equivalent weight of about 1,350.
[3] Foam split badly.

In the commercial preparation of flexible urethane foam slab stock, several of the components are metered to a mixing nozzle, one of which is the tin catalyst employed as a co-catalyst in addition to the amine catalyst. In most formulations, small variation in the level of the tin catalyst often causes substantial adverse effects upon the physical properties of the foams. Since the metering equipment employed can cause variation in the amount of tin catalyst fed to the mixing head, it is most advantageous to employ an amine catalyst in the foam formulation which can tolerate a wide variance in tin catalyst. As can be seen in Table I, the catalyst of the present invention, tris[2-(dimethylamino)ethyl]amine is superior to the amine ethers bis(dimethylamino)ether in this respect, in that the catalyst of the present invention produced a foam with acceptable physical properties over a tin catalyst range of 0.125–0.20 whereas the amine ether catalyst did not produce foams of acceptable physical properties within the tin catalyst range of 0.125–0.20 in that at the 0.15 level, the foam split badly.

EXAMPLE 2

This example compares the activity of the catalyst of the present invention with that of tetramethylbutane diamine and dimethylethanolamine in the preparation of polyurethane foams. The foaming procedure was identical to that employed in Example 1. The recipe and results are given in Table II. The rise time was employed as an indication of relative catalytic activity. Rise time starts when the isocyanate is added to the rest of the formulation and ends when the foam completes its rise (usually detected by gas blowing out through the top of the foam). Each of the catalysts employed was on an equivalent nitrogen basis, i.e., they were added in quantities such that each formulation contained the same amount of nitrogen, 0.243 gram per 100 grams of polyol.

TABLE II

| Formulation (parts by weight) | Foam number | | |
|---|---|---|---|
|  | 1 | 2 | 3 |
| CP 4701 [1] | 100 | 100 | 100 |
| Water | 2.5 | 2.5 | 2.5 |
| Tris[2-(dimethylamino)ethyl]amine | 1.0 | 0 | 0 |
| Tetramethyl-2,3-butanediamine | 0 | 1.25 | 0 |
| Dimethylethanolamine | 0 | 0 | 1.6 |
| Isocyanate [2] | 45.3 | 45.3 | 45.3 |
| Foaming conditions: |  |  |  |
| Rise time, seconds | 40 | 78 | 146 |
| Tack free time, seconds | 230 | 1,155 | 806 |

[1] CP 4701 is a glycerine initiated polyoxypropylene triol end capped with ethylene oxide having an OH equivalent weight of 1,550.
[2] The isocyanate was a 2.3 functional polymethylene polyphenylisocyanate having an NCO equivalent weight of 132.

The above data clearly indicates that the catalyst of the present invention, foam #1, is more active, as indicated by the lower rise time, than the conventional tertiary amine used in foam 2 and 3.

We claim:
1. A process for the preparation of polyurethanes which comprises reacting an organic polyisocyanate with a polyester polyol or polyether polyol in the presence of a catalytic quantity of tris[2-(dimethylamino)ethyl]amine.

2. The process of Claim 1 wherein the polyol is a polyether polyol.

3. The process of Claim 2 wherein the quantity of tris[2 - (dimethylamino)ethyl]amine is from about 0.01 to about 2.0 percent by weight of polyisocyanate and polyether polyol.

4. The process of Claim 2 wherein a tin co-catalyst is employed.

5. The process of Claim 2 wherein the polyether polyol is a triol.

6. The process of Claim 5 wherein the triol is a glycerine initiated polyether polyol.

7. The process of Claim 6 wherein the polyisocyanate is toluene diisocyanate.

8. The process of Claim 6 wherein the polyisocyanate is polymethylene polyphenyl isocyanate.

9. The process of Claim 2 wherein said polyurethane is a polyurethane foam.

10. The process of Claim 4 wherein said polyurethane is a polyurethane foam.

References Cited

UNITED STATES PATENTS 3,036,020 5/1962 Great Britain ----- 260—2.5 AC
3,239,480 3/1966 Windemuth ----- 260—77.5 AC MAURICE J. WELSH, Jr., Primary Examiner U.S. Cl. X.R.

260—75 NC, 77.5 AC, 471 C